United States Patent
Garrec et al.

(10) Patent No.: US 8,318,290 B2
(45) Date of Patent: Nov. 27, 2012

(54) SUBSTRATE WHICH IS PROTECTED AGAINST ORGANIC POLLUTION

(75) Inventors: Ronan Garrec, Claix (FR); Rino Messere, Modave (BE)

(73) Assignee: Saint-Gobain Glass France, Courbevoie (FR)

( * ) Notice: Subject to any disclaimer, the term of this patent is extended or adjusted under 35 U.S.C. 154(b) by 883 days.

(21) Appl. No.: 11/720,762

(22) PCT Filed: Nov. 30, 2005

(86) PCT No.: PCT/FR2005/051016
§ 371 (c)(1),
(2), (4) Date: Nov. 27, 2009

(87) PCT Pub. No.: WO2006/059042
PCT Pub. Date: Jun. 8, 2006

(65) Prior Publication Data
US 2010/0062227 A1    Mar. 11, 2010

(30) Foreign Application Priority Data

Dec. 2, 2004    (FR) ..................................... 04 52845

(51) Int. Cl.
*B32B 3/02* (2006.01)
(52) U.S. Cl. ........ 428/157; 428/192; 428/210; 428/172; 428/429; 428/432; 52/204.5
(58) Field of Classification Search .................. 428/192, 428/210, 157, 172, 429, 432; 52/204.5
See application file for complete search history.

(56) References Cited

U.S. PATENT DOCUMENTS

| 2002/0115770 A1* | 8/2002 | Georgeau et al. ............. 524/377 |
| 2004/0067343 A1* | 4/2004 | Beteille et al. ................ 428/192 |
| 2005/0084688 A1* | 4/2005 | Garrec et al. ................. 428/432 |
| 2006/0096614 A1* | 5/2006 | Krisko ............................. 134/6 |

FOREIGN PATENT DOCUMENTS

| EP | 0 850 204 | 12/2001 |
| EP | 1 553 150 | 7/2005 |
| FR | 2 294 314 | 7/1976 |
| FR | 2 552 153 | 3/1985 |
| JP | 8 302856 | 11/1996 |
| JP | 2002-020458 | 1/2002 |
| JP | 2003-268350 | 9/2003 |
| JP | 2004-300863 | 10/2004 |
| WO | 2004 035707 | 4/2004 |

OTHER PUBLICATIONS

Office Action dated Jan. 10, 2012 as received in the corresponding Japanese Patent Application No. 2007-543890. (English translation only).

* cited by examiner

*Primary Examiner* — Gerard Higgins
*Assistant Examiner* — Christopher Polley
(74) *Attorney, Agent, or Firm* — Oblon, Spivak, McClelland, Maier & Neustadt, L.L.P.

(57) ABSTRACT

The invention relates to a substrate (1) which is equipped with a mastic (3) along at least part of the periphery thereof, said mastic comprising silicon-type components. The invention is characterized in that a barrier to the migration of the silicons (5, 7, 8) is disposed on the surface (2) of the substrate (1).

9 Claims, 2 Drawing Sheets

SUBSTRATE WHICH IS PROTECTED AGAINST ORGANIC POLLUTION

CROSS-REFERENCE TO RELATED APPLICATIONS

This application is a 371 of PCT/FR05/51016 filed Nov. 30, 2005 and claims the benefit of FR0452845 filed Dec. 2, 2004.

The present invention relates to a substrate whose surface is protected against organic pollution stemming from peripheral seals, in particular mastics comprising silicone-type materials.

The substrate is composed of a metal, a metal alloy, a ceramic, a glass, oxide or essentially mineral material, especially, in the latter two cases, in the form of thin film coatings on a substrate, in particular a glass substrate. The invention takes on a particular significance when the substrate is transparent and requires a high optical quality, which is the case for a glass substrate, or a substrate made of glass equipped with one or more functional coating layers, in particular when these functional layers impart a hydrophilic character to said substrate.

In many technical fields, assemblies and juxtapositions of various materials and of various components that are either traditional (concrete, bricks, steel or concrete beams, glass, etc.) or modern, prefabricated or synthetic (doors, windows, panels, plastics, etc.) are encountered and it is necessary to make provision for the interstices or joints between these different materials and components, as they have different dimensional variations depending on temperature or moisture variations and also different movements under the effect of the wind, bindings, weight of the structure, and flow of certain components. The word "joint" therefore denotes either the separation line and the packing or weatherstripping or an interstice between two elements whether they are of the same nature or of different nature, or a desired continuity solution, that is to say a rectilinear break created in a structure to absorb the differences in movement or in behavior.

These joints must then be filled with weatherstripping products and the joint then also denotes the assembly of the interstice and of the weatherstripping product used to seal it. Among the weatherstripping products, a mastic is defined, within the meaning of the present invention, as a pasty, malleable, plastic or elastic material, applied in a joint and forming weatherstripping by adhering to the surfaces inside this joint.

A large number of weatherstripping and sealing mastics contain silicone-type components (also known as polysiloxanes). The silicone mastics are characterized by their properties of elasticity, durability and adhesion onto many substrates, and are thus very frequently used to provide sealing for glazing onto all mediums, and also between sanitary components and walls. Silicones are also incorporated into the composition of many other mastics as plasticizers (to impart plasticity, even elasticity, to the material). Moreover, the addition of silicone oils (low molecular weight silicones) on the surface of the mastics facilitates their use. Thus, mastics containing silicone-type components are many and varied.

It has turned out that silicone-type compounds always contain, in a greater or lesser proportion, low molecular weight polysiloxanes (often called "silicone oils") which have the property of migrating toward the surface of the mastics then onto the surface of the materials, making said surface polluted by the silicones very difficult to clean. This property comes from the fact that the silicones have a surface energy that is among the lowest known surface energies and may therefore very easily wet any type of surface, in particular high-energy surfaces.

This problem appears particularly important when the surface has a hydrophilic character, as the silicone surfaces are extremely hydrophobic. When in contact with water, the polluted area becomes extremely visible in contrast with the unpolluted area, as the water perfectly wets the hydrophilic surfaces, creating a film of water, whereas the hydrophobic surfaces are not wetted by the water, the latter stagnating in the form of droplets.

The hydrophilic surfaces may be linked to the surface state of the substrate. A clean glass or metal surface, for example, has a high surface energy and therefore a hydrophilic character, being expressed by a water contact angle of less than 15°. The surface hydrophilicity may also be due to coatings that are especially adapted for conferring this property. On substrates such as ceramics or glass, coatings comprising at least partially crystalline titanium oxide, especially in anatase form, give said substrate "superhydrophilicity" properties, characterized by a water contact angle of less than 5°, or even less than 1°. Such coatings, which have, in addition, photocatalysis properties, are for example described in Application EP-A-0 850 204. Other types of coatings having a hydrophilic character are also known. Mention will be made, for example, of coatings based on $SiO_2$ and/or $SiOC$, in particular when they are textured, the texture having patterns of dimensions around 10 to 200 nm, especially in the form of nodules.

The object of the invention is therefore to protect the surface of a substrate from pollution coming from mastics that comprise silicone-type components.

To that effect, the subject of the invention is a substrate having, on at least one part of its periphery, a mastic comprising silicone-type components, characterized in that a barrier to the migration of the silicones is placed on the surface of said substrate.

The substrate may be made from a metal, metal alloy, ceramic, glass, oxide or essentially mineral material, especially, in the latter two cases, in the form of thin-film coatings on a substrate, in particular, a glass substrate. The substrate according to the invention is preferably a glass-based or ceramic-based substrate having, on at least one part of one of its faces, at least one thin film (in this case, the surface of the substrate is classed as the surface of the outer thin film, the only one capable of being polluted by the migration of the silicones), in particular a coating conferring a pronounced hydrophilic character such as a coating comprising at least partially crystalline titanium oxide, especially in anatase form, according to the teaching of the aforementioned Application EP-A-0 850 204. Such a coated substrate has photocatalytic and superhydrophilic properties, making it capable of self-cleaning owing to the removal of organic and mineral soiling under the combined effect of a stream of water, especially of rain, and visible and/or ultraviolet radiation, such as solar radiation. In the latter case, the silicone-based pollution is, indeed, able to constitute a poison for the self-cleaning activity of the coating.

Within the scope of the present invention, the term "barrier" is understood to mean any means making it possible to limit, or even suppress, the migration of silicones.

According to a first embodiment of the invention, the barrier to the migration of the silicones is based on a polymer, preferably an elastomeric mastic that does not comprise any silicone-based plasticizers.

The polymer acting as a barrier is preferably deposited in the form of a bead onto the surface of the substrate to be protected, either in direct contact with the mastic comprising the silicone-type compounds, or opposite to and at a distance of a few millimeters from said mastic. This second option is the one which has the greatest advantages.

The elastomeric mastic acting as a barrier to the migration of silicones is preferably based on an MS polymer. MS polymers are silyl-terminated polyethers. A nonlimiting example of such an MS polymer is the polymer composed of a polyoxypropylene chain terminated by dimethoxysilyl groups. Due to the absence of cohesive units in their main chain, these polymers have a high flexibility and often do not require the addition of plasticizers (and therefore no silicone-based plasticizers), or even of solvents.

It appears, surprisingly and for the time being inexplicably, that such barriers effectively protect the surface of the substrate. Since silicone oils have the ability to wet any type of material, it was not imagined that such a barrier, being of whatever nature, could have a real effectiveness. Without wishing to be tied to any one scientific theory, the origin of the very high effectiveness of the polymers from the family of MS polymers could stem from strong interactions between the silicone oils and the silyl end groups of the MS polymer.

The barrier may also be composed of a thick layer, the thickness of which is preferably between 100 nm and 2 micrometers, comprising at least partially crystalline titanium oxide, and preferably even almost completely crystalline titanium oxide in anatase form. This layer preferably has a large specific surface area: it may be, for example, a layer of silica deposited by a sol-gel type process at the periphery of the surface to be protected, said silica layer comprising titanium oxide particles, as described, for example in Application WO-A-03/087002. The effectiveness of such a barrier probably lies in its very high photocatalytic activity, such layers being capable of degrading the silicone molecules under visible or ultraviolet radiation, the kinetics of degradation occurring more rapidly than the kinetics of migration of said molecules.

According to a second embodiment, the barrier to the migration of the silicones may be formed from a notch or a groove located on the surface of the substrate and opposite to the mastic that is a source of silicones. The groove or notch advantageously has a depth ranging from 10 to 200 micrometers and a width ranging from 100 micrometers to 2 millimeters.

It appears that the groove acts as a trap for the silicone oils. The dimensions of the groove are adapted depending on the quantity of silicone which may migrate, and taking into account a possible embrittling effect when the substrate is made from a brittle material such as glass or a ceramic.

A third embodiment of the invention, in the case where the substrate is composed of a glass-based or ceramic-based substrate coated with at least one thin film, consists in marginating said thin film, that is to say in removing the thin film at the periphery of said substrate by mechanical and/or chemical processes. The barrier to the migration of silicones is thus formed from a peripheral margination of the thin film. It has, indeed, been proved, in particular when the thin film is based on titanium oxide, that the silicones found it more difficult to migrate onto the glass surface than onto the surface of the film. A stronger interaction between the silicon atoms of the silicones and the glass surface is possibly the cause of such a phenomenon. To form an effective barrier, it is essential that the margination be such that there is a marginated zone which is not covered by the mastic, the width of said uncovered zone advantageously being greater than or equal to 0.5 cm, or even 1 or 2 cm. It is known to only marginate the zone covered by the mastic in order to avoid degrading the mastic with the thin film when the latter has a photocatalytic activity, but this does not prevent the silicones from the mastic from migrating to the surface of the thin film. Such a peripheral margination may be accompanied by the creation of a beveled edge, also called a chamfered edge.

The present invention will be better understood on reading the detailed description below of nonlimiting exemplary embodiments and the appended figures.

Figure 1:
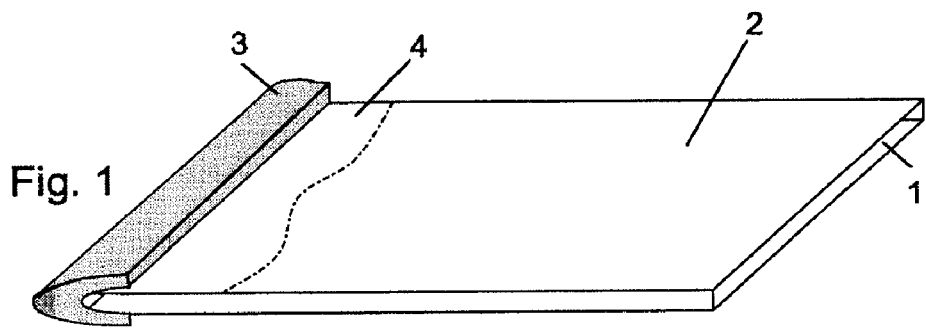
FIG. 1 illustrates a perspective view of a flat substrate having on one part of its periphery a mastic comprising silicone-type components.

FIG. 1 illustrates a perspective view of a flat substrate made of soda-lime-silicate glass 1 having, on one part of its periphery, a mastic 3 comprising silicone-type components. The silicone oils migrate to the surface 2 of said substrate 1, and create a polluted surface 4 that is extremely hydrophobic and difficult to clean.

Figure 2:
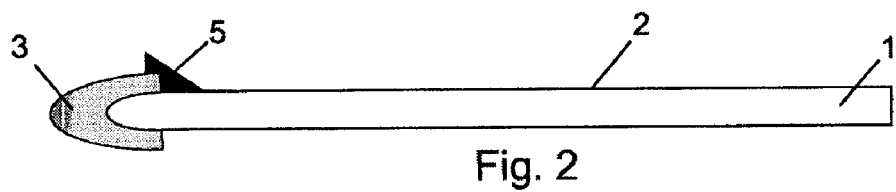
FIG. 2 illustrates a cross-sectional view of a substrate, placed on the surface of which is a barrier to the migration of silicones that is based on a polymer deposited in contact with the mastic comprising silicone-type components.

The substrate 1 from FIG. 2, represented here in cross section, on the other hand retains a clean surface 2 thanks to the use of a barrier to the migration of silicones 5 based on MS polymer, more particularly MS polymer composed of a polyoxypropylene chain terminated by dimethoxysilyl groups. The bead of MS polymer 5 is deposited here in direct contact with the mastic 3.

Figure 3:
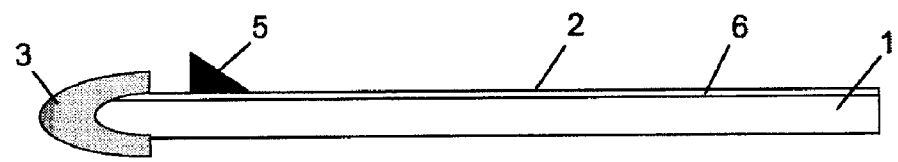
FIG. 3 illustrates a cross-sectional view of a substrate possessing, on one of its faces, a thin film, placed on the surface of which is a barrier to the migration of silicones that is based on a polymer deposited at a distance of a few millimeters from the mastic comprising silicone-type components.

FIG. 3 illustrates a different embodiment, as the bead of polymer 5 acting as a barrier to the migration of silicones is deposited at about 5 millimeters from the mastic 3, a configuration that has an even greater effectiveness. In the case represented in the present figure, the substrate 1 also has on one of its faces, a thin film 6, the surface 2 of said substrate 1 then being classed as the surface of said thin film 6, as only this surface 2 is capable of being polluted by the silicones. The thin film 6 is here a coating of around 15 to 20 nanometers, based on predominantly crystalline titanium oxide in the crystallographic anatase form, deposited by a chemical vapor deposition (CVD) technique. This thin film 6 gives the surface 2 photocatalytic properties and a pronounced hydrophilic character. Since the substrate 1 is in this specific case made of soda-lime-silicate glass, this thin film is advantageously placed not directly on the substrate 1 but on a sublayer that is a barrier to the migration of alkalis, not shown in the figure.

Figure 4:
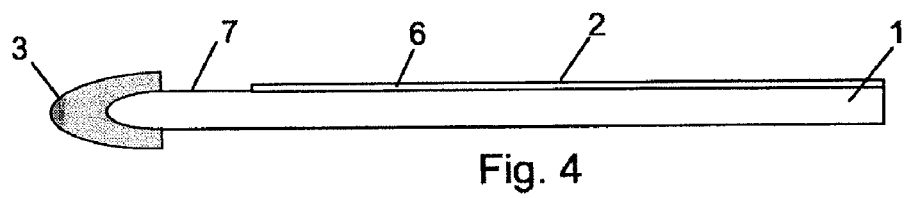
FIG. 4 illustrates a cross-sectional view of a substrate possessing, on one of its faces, a thin film that is removed at the periphery.

The same type of substrate is presented in FIG. 4, but in this embodiment of the invention, the barrier to the migration of silicones is formed from a peripheral margination 7 of the thin film 6. This peripheral margination 7 has the effect of removing the thin film 6 at the periphery of the substrate, thus creating a marginated zone 7 that is free from the thin film 6 and not covered by the mastic 3.

Figure 5:
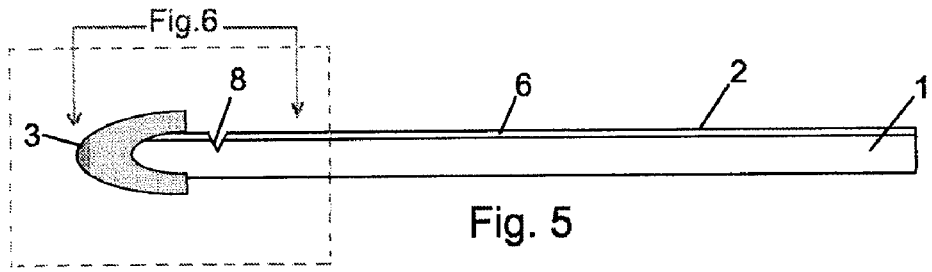
FIG. 5 illustrates a cross-sectional view of a substrate where the barrier to the migration of silicones is formed from a notch.

FIG. 5 presents another embodiment according to the invention, according to which the barrier to the migration of silicones is a notch 8. The thin film 6 is of the same type as that presented in FIG. 3.

Figure 6:
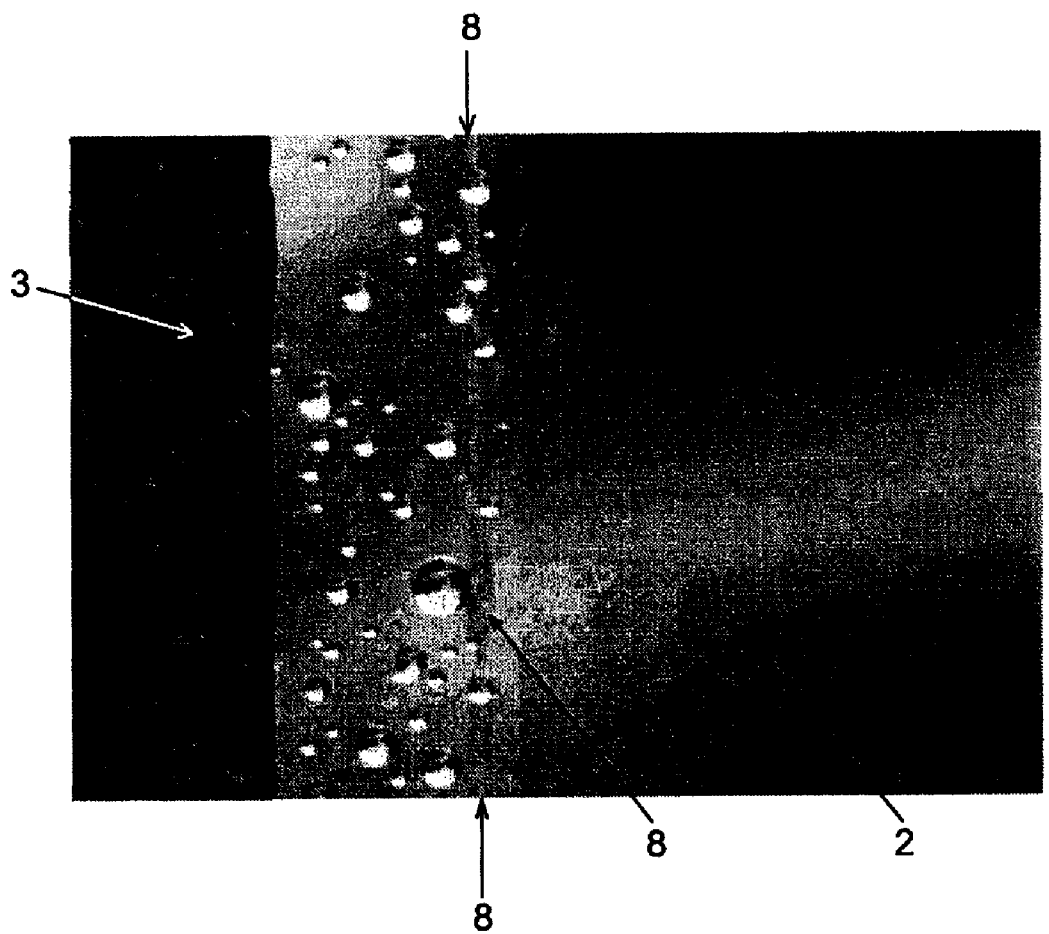
FIG. 6 illustrates a photograph of the surface of the substrate represented schematically in FIG. 5.

The effectiveness of the latter embodiment is presented in the photograph of FIG. 6: the mastic 3 forms the black-colored part on the left of the figure, the groove 8 being positioned vertically approximately in the center of the figure. After sprinkling with water, the part of the surface 2 located on the left of the groove 8 has a very strong hydrophobic character that is expressed by high water contact angles and that is polluted by silicone oils. On the contrary, the part of the surface 2 located on the right of the groove is perfectly hydrophilic, therefore it is not polluted by silicone oils.

The present invention is described in what has gone before by way of example. It is understood that a person skilled in the art is able to carry out various variants of the invention without so much as going outside the scope of the patent as defined by the claims.

The invention claimed is:

1. A protected substrate, comprising a substrate composed of glass or ceramic,
    a thin film coating that imparts a hydrophilic character to said substrate on at least one part of a face of said substrate,
    a mastic comprising silicone on at least a part of a periphery of said substrate; and
    on a surface of the thin film coating positioned near the periphery as a barrier to migration of the silicone of the mastic, an elastomeric barrier comprising a silyl-terminated polyether.

2. The substrate of claim 1, wherein the thin film coating comprises at least partially crystalline titanium oxide.

3. The substrate of claim 2, wherein the at least partially crystalline titanium oxide is titanium dioxide in anatase form.

4. The substrate of claim 1, wherein the silyl-terminated polyether does not comprise a silicone plasticizer.

5. The substrate of claim 1, wherein the silyl-terminated polyether is in the form of a bead.

6. The substrate of claim 5, wherein the elastomer barrier comprising the silyl-terminated polyether is in direct contact with the mastic comprising silicone.

7. A protected substrate composed of glass or ceramic, comprising
    a substrate,
    a thin film coating that imparts a hydrophilic character to said substrate on at least one part of a face of said substrate,
    a mastic comprising silicone on at least a part of a periphery of said substrate; and
    a groove or notch positioned near the periphery that acts as a barrier to migration of the silicone of the mastic onto the thin film coating.

8. The substrate of claim 7, wherein the thin film coating comprises at least partially crystalline titanium oxide.

9. The substrate of claim 8, wherein the at least partially crystalline titanium oxide is titanium dioxide in anatase form.

\* \* \* \* \*